(12) United States Patent  
Chelcun

(10) Patent No.: US 8,537,516 B1  
(45) Date of Patent: Sep. 17, 2013

(54) APPARATUS, METHOD, AND SYSTEM FOR MONITORING OF EQUIPMENT AND EARTH GROUND SYSTEMS

(75) Inventor: Darrell N. Chelcun, West Dundee, IL (US)

(73) Assignee: Musco Corporation, Oskaloosa, IA (US)

( * ) Notice: Subject to any disclaimer, the term of this patent is extended or adjusted under 35 U.S.C. 154(b) by 949 days.

(21) Appl. No.: 12/559,863

(22) Filed: Sep. 15, 2009

Related U.S. Application Data

(60) Provisional application No. 61/201,065, filed on Dec. 5, 2008.

(51) Int. Cl.  
*H02H 9/02* (2006.01)

(52) U.S. Cl.  
USPC ............. 361/93.1; 361/42; 361/48; 361/50

(58) Field of Classification Search  
USPC ..................... 361/93.1, 42, 48, 50  
See application file for complete search history.

(56) References Cited

U.S. PATENT DOCUMENTS

| | | | |
|---|---|---|---|
| 3,253,188 A * | 5/1966 | Nissel | 361/50 |
| 4,321,643 A * | 3/1982 | Vernier | 361/48 |
| 4,370,692 A | 1/1983 | Wellman, Jr. et al. | |
| 4,415,850 A | 11/1983 | Sherwood | |
| 4,472,676 A | 9/1984 | Eichmann et al. | |
| 4,549,241 A | 10/1985 | Morris et al. | |
| 5,027,108 A | 6/1991 | Gray | |
| 5,311,392 A * | 5/1994 | Kinney et al. | 361/93.2 |
| 5,514,964 A * | 5/1996 | Benesh et al. | 324/509 |
| 6,054,865 A * | 4/2000 | Bald et al. | 324/551 |
| 6,091,337 A | 7/2000 | Arshad et al. | |
| 6,097,580 A | 8/2000 | Zaretsky | |
| 6,392,422 B1 | 5/2002 | Kammer | |
| 6,396,284 B1 | 5/2002 | Tisdale et al. | |
| 6,397,156 B1 * | 5/2002 | Bachmann et al. | 702/65 |
| 6,421,618 B1 | 7/2002 | Kliman et al. | |
| 6,631,063 B2 | 10/2003 | Ortiz et al. | |
| 6,681,110 B1 | 1/2004 | Crookham et al. | |
| 7,301,739 B2 | 11/2007 | Hamer | |
| 7,501,830 B2 | 3/2009 | Kumar | |
| 2006/0119368 A1 * | 6/2006 | Sela et al. | 324/522 |

FOREIGN PATENT DOCUMENTS

DE 20301059 * 5/2003

OTHER PUBLICATIONS

"Control Link—Flexible control and solid management of your facility, saves operating costs and improves service", Musco Corporation, Oskaloosa, Iowa, 2005, 9 pages.

"Control Link—Permanent Lighting", webpage printout [retrieved from the Internet: www.control-link.com], 1997-2010, Musco Sports Lighting, LLC, 2 pages.

(Continued)

*Primary Examiner* — Rexford Barnie  
*Assistant Examiner* — Zeev V Kitov  
(74) *Attorney, Agent, or Firm* — McKee, Voorhees & Sease, P.L.C.

(57) ABSTRACT

Disclosed are apparatus, methods, and systems for the monitoring of grounding components in an electrical system. Methods of monitoring grounding components comprise a signal or plurality of signals imposed on a ground loop circuit by a first inductive element, a second inductive element which receives the signal(s), and circuitry which compares changes in the imposed signal(s) to a baseline to calculate impedance. Active monitoring of impedance enables contractors to ensure installation of a grounding system was performed correctly, and allows a user to track changes in impedance over the life of the electrical system such that, if an impedance threshold is reached, appropriate action may be taken.

22 Claims, 12 Drawing Sheets

(56) References Cited

OTHER PUBLICATIONS

Gonzalez, Avelino J., et al., "Monitoring and Diagnosis of Turbine-Driven Generators", Practice Hall, Englewood Cliffs, New Jersey 07632, 1995, 8 pages.

"Ground (electricity)", Wikipedia printout, [retrieved on Sep. 11, 2009 from the Internet: http://en.wikipedia.org/wiki/Groung_(electricity), 6 pages.

Ground-Fault Circuit Interrupters (KCXS), 2008 Guide Information for Electrical Eqiupnnent—The White Book, p. 179 (1 page).

Jaske, E. Juhani, "Technical Paper—Ground Fault Monitoring Using Leakage Current Measurement", Powersystems World 1996, Power Control Products, Inc., Golden, Colorado 80401, 23 pages.

Smeaton, Robert W., "Motor Application and Maintenance Handbook", McGraw-Hill Book Company, 1969, 5 pages.

"Special Purpose Ground Fault Circuit Interrupter Outline of Investigation", Apr. 10, 2000, 9 pages.

"μPSD3200 family—A highly integrated Flash 8032 microcontroller with programmable logic and USB", STMicroelectronics, Apr. 2003, 4 pages.

\* cited by examiner

MULTIPLEXER OUTPUT CIRCUIT

MULTIPLEXER INPUT CIRCUIT

APPARATUS, METHOD, AND SYSTEM FOR MONITORING OF EQUIPMENT AND EARTH GROUND SYSTEMS

CROSS-REFERENCE TO RELATED APPLICATIONS

This application claims priority under 35 U.S.C. §119 to provisional U.S. application Ser. No. 61/201,065, filed Dec. 5, 2008, hereby incorporated by reference in its entirety.

I. BACKGROUND OF INVENTION

The present invention generally relates to monitoring the integrity of grounding components in an electrical system. More specifically, the present invention relates to various apparatuses and methods by which a signal may be imposed on an electrical system by a first inductive element and received by a second inductive element such that grounding system impedance may be determined and integrity of grounding components assessed.

It is well known that methods of equipment grounding are necessary to protect the equipment in an electrical system from adverse electrical effects that may result in equipment failure, such as electrical surges. Methods of equipment grounding are well known in the art and are required in most applications by the United States National Electric Code (NEC), National Fire Prevention Association (NFPA), and local codes. It is also well known that methods of earth grounding are necessary to provide an electrical system with a low impedance path to ground such that electrical energy from adverse electrical effects, such as lightning, may be dissipated and risk of personal injury from electrical shock hazards may be minimized. Methods of earth grounding are well known in the art and are generally subject to the same governing codes as equipment grounding.

Said governing codes generally require impedance measurements of the equipment and earth grounding systems, which may be completed during installation using commercially available methods. One such method utilizes portable clamp-on meters which, while functional, require onsite personnel and may be time-consuming and unreliable due to operator error and inconsistent methods of measuring. Further, clamp-on meters and other methods of measuring impedance in grounding systems are generally single channel devices that may be prohibitively expensive to utilize in an electrical system with a plurality of grounding systems or components therein.

Also challenging is that commercially available methods of measuring impedance in grounding systems produce an instantaneous measurement and do not allow for practical recurrent testing. Impedance measurements of equipment and earth grounding systems completed at the time of installation may verify adherence to governing codes, however, impedance of the grounding systems may increase over the life of the electrical system (e.g. due to corrosion or theft). In the current state of the art, to accurately measure the impedance of an equipment and earth grounding system after installation is complete, trained personnel must repeatedly return to the site with specialized equipment, which may be time-consuming and cost-prohibitive.

However, repeated impedance measurements by trained personnel returning to an application site do not ensure the overall electrical system is compliant with governing codes during periods of time between visits. The current state of the art may benefit from methods of actively monitoring the integrity of the equipment and earth grounding components of an electrical system such that changes in system impedance may be tracked, a user of the electrical system notified when system impedance increases to undesirable levels, and optionally, methods of disabling components of an electrical system in response to impedance increases. Thus, there is room for improvement in the art.

II. SUMMARY OF THE INVENTION

Over time, the effectiveness of grounding components in an electrical system may be diminished for a variety of reasons. Currently available methods of measuring system impedance, while generally adequate when an electrical system is first installed, may become cost-prohibitive and ineffective over the life of the electrical system and, thus, inadequate to determine grounding component effectiveness long-term. Envisioned are apparatus, methods, and systems whereby grounding components of an electrical system may be monitored and tested over the life of an electrical system such that effectiveness of grounding components may be verified and, optionally, provisions made to address inadequate effectiveness (e.g. disabling power to components of the electrical system, notifying the user of the electrical system, etc.). One typical application may be a large area outdoor sports lighting system and the grounding system components therein, but any electrical system with grounding components or conductive elements to be actively monitored may likewise benefit.

It is therefore a principle object, feature, advantage, or aspect of the present invention to improve over and/or solve problems and deficiencies in the state of the art. Further objects, features, advantages, or aspects of the present invention may include one or more of the following:
  a. identifying, isolating, and grouping grounding components of an electrical system,
  b. imposing a signal or plurality of signals on each isolated group of grounding components,
  c. receiving an imposed signal or plurality of signals and determining impedance for each isolated group of grounding components,
  d. monitoring, tracking, and testing the impedance of grounding components in an electrical system,
  e. determining an impedance threshold and issuing some form of alarm if said threshold is approached and/or exceeded, and
  f. communication between ground monitoring components and:
    a. a control device or system (located remote from or integral to the electrical system),
    b. a power regulating component of the electrical system, and/or
    c. other components of the electrical system.

These and other objects, features, advantages, or aspects of the present invention will become more apparent with reference to the accompanying specification.

A method according to one aspect of the present invention comprises creating a ground loop circuit whereby an imposed signal or plurality of signals may travel and a response or responses may be measured. A ground loop circuit, as described throughout the specification, may comprise any number and/or combination of electrical system components (e.g. electrode connective device(s) (e.g. bolts, lugs, terminal blocks, etc.), earth ground wire(s), equipment ground wire(s), ground monitoring system module(s), etc.) operatively connected to each other (whether directly or indirectly) such that a complete electrical circuit (as defined for an application) exists. For example, the ground loop circuit could be completely hardwired, or it could include a leg or section that is a current path either between two conductors such as spaced apart conductors in the earth or through a conductive medium such as a metal enclosure box or metal tubular conduit.

An apparatus according to one aspect of the present invention comprises circuitry and power supply elements controlling a plurality of inductive elements installed on each ground loop circuit so that a signal or a plurality or signals may be imposed by a first inductive element and a response measured by a second inductive element.

An apparatus according to another aspect of the present invention comprises a user interface controlling onsite test functionality of the inductive elements, as well as display functionalities and alarm notification, for each ground loop circuit.

A system according to one aspect of the present invention comprises integration of equipment and earth grounding in a sports lighting system, and monitoring and testing the impedances in the grounding components therein.

III. BRIEF DESCRIPTION OF THE DRAWINGS

From time-to-time in this description reference will be taken to the drawings which are identified by figure number and are summarized below.

IV. DETAILED DESCRIPTION OF EXEMPLARY EMBODIMENTS

A. Overview

Figure 1A:
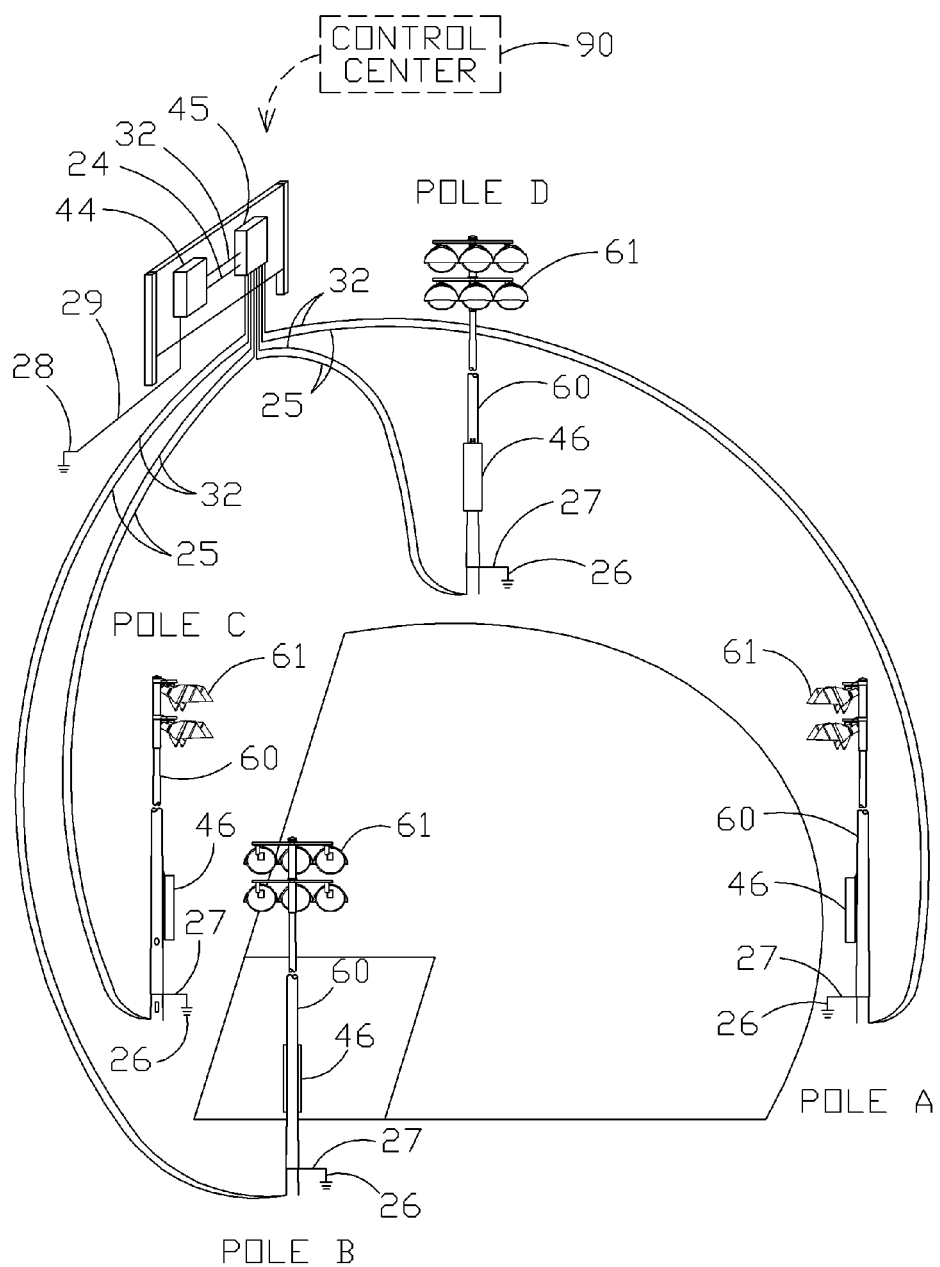
FIG. 1A illustrates a typical system sports lighting system according to at least one aspect of the present invention.

To further understanding of the present invention, specific exemplary embodiments according to the present invention will be described in detail. Frequent mention will be made in this description to the drawings. Reference numbers will be used to indicate certain parts in the drawings. The same reference numbers will be used to indicate the same parts throughout the drawings.

As has been stated, methods of equipment and earth grounding are required by most national and local governing codes for many electrical systems, particularly those which pose electrical shock hazards if not properly grounded. An electrical system according to at least some aspects of the present invention is illustrated in FIG. 1A-C and may generally be characterized by the following.

Figure 1B:
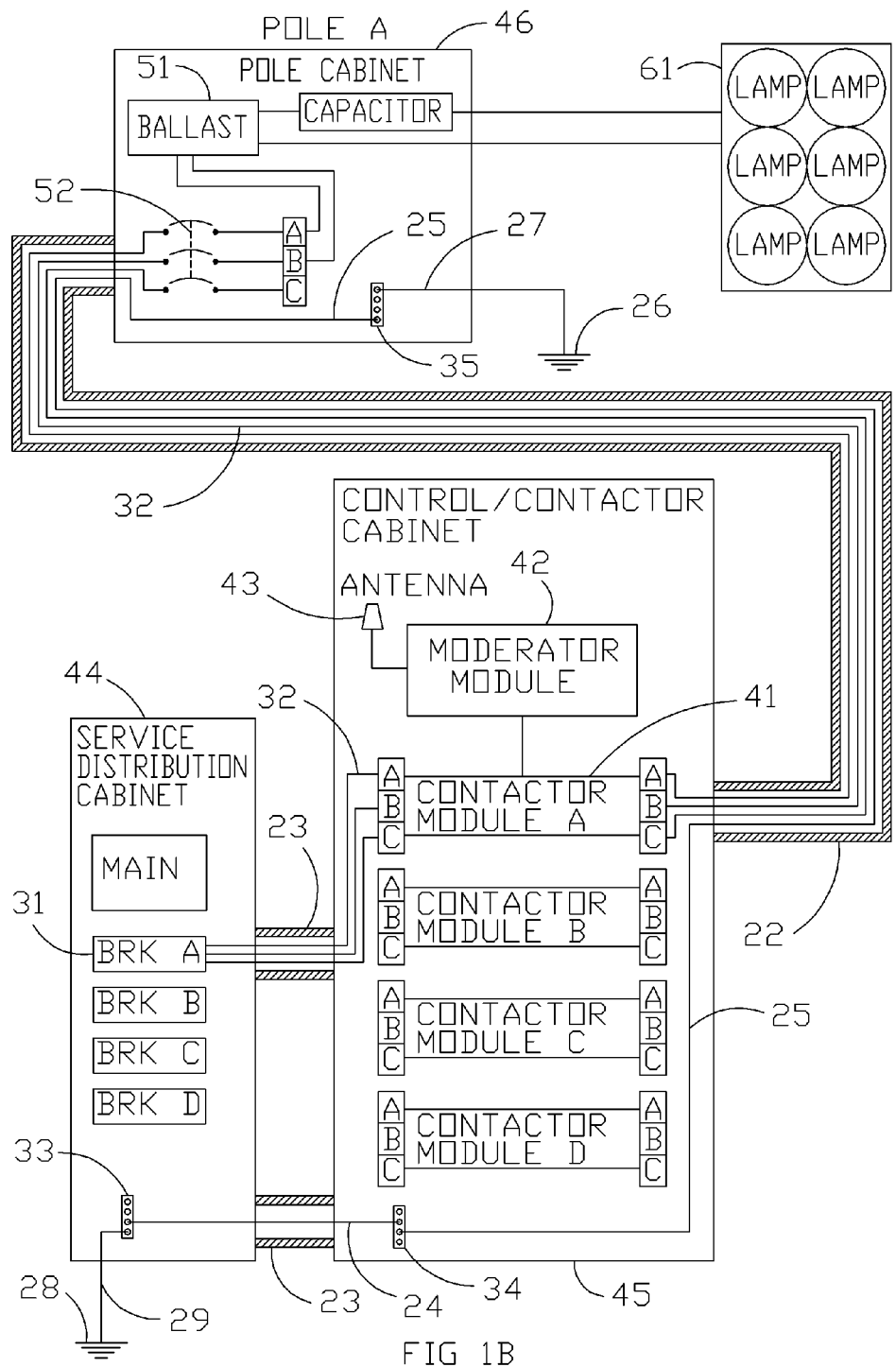
FIG. 1B illustrates a partial block diagram of the electrical components of the system illustrated in FIG. 1A.
Figure 1C:
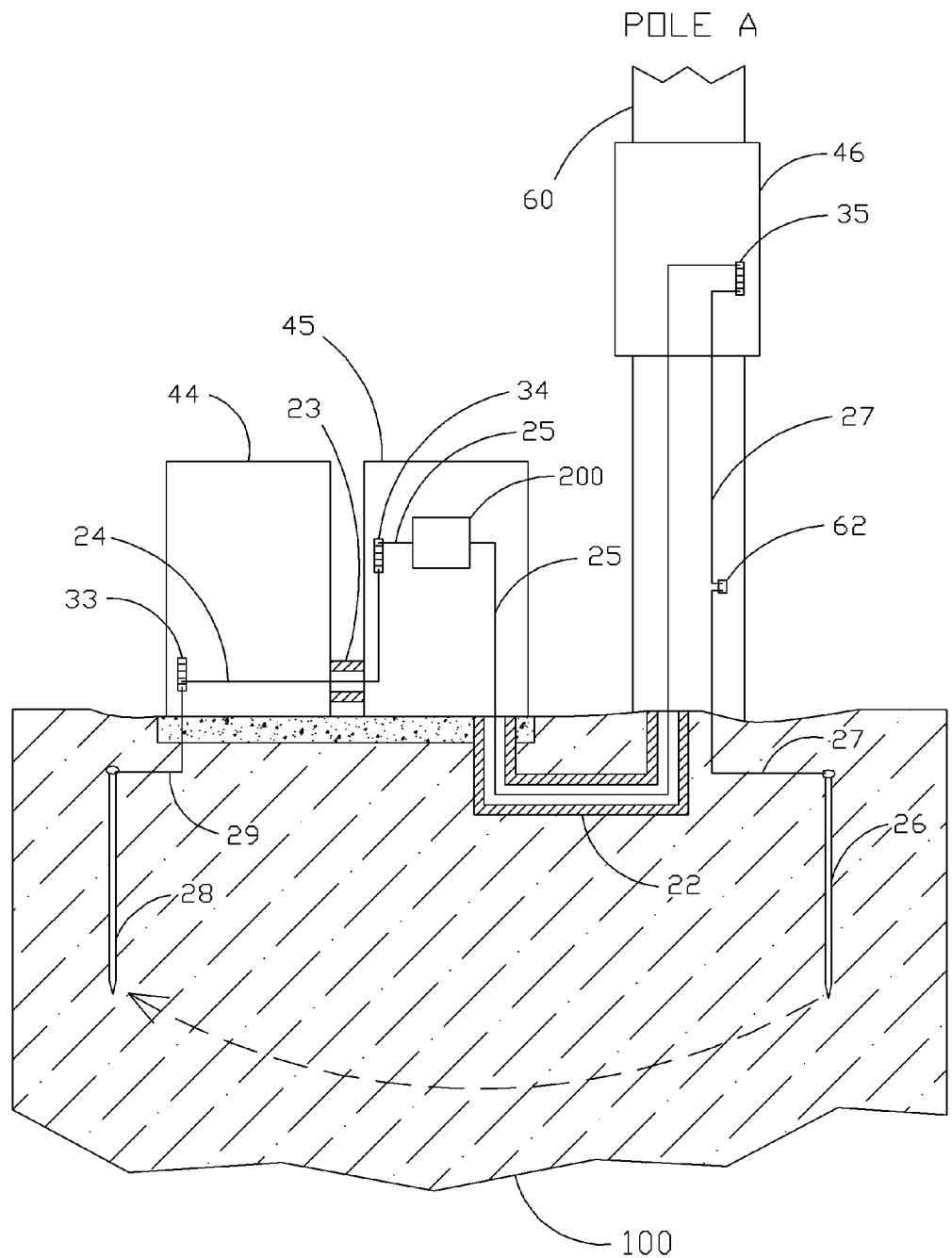
FIG. 1C illustrates a typical ground loop circuit for the system illustrated in FIG. 1A.

With respect to FIG. 1A, four banks of light fixtures 61 are powered via electrical cables 32 from a service distribution cabinet 44 and control/contactor cabinet 45.

Distribution cabinet 44 and contactor cabinet 45 are connected via electrical cable 32 and equipment ground wire 24.

Distribution cabinet 44 is connected to equipment ground wire 29 and equipment ground electrode 28.

Each fixture bank 61 is housed at a pole 60.

Each pole further comprises a pole cabinet 46, earth ground wire 27, and earth ground electrode 26.

Equipment ground wire 25 connects each pole with control/contactor cabinet 45.

Remote control functionality of the electrical system may be enabled by a control center 90. An example of remote operation may be found in U.S. Pat. No. 6,681,110, incorporated by reference herein, and commercially available under the trade name CONTROL-LINK® from Musco Sports Lighting, LLC, Oskaloosa, Iowa, USA. As may be appreciated by one skilled in the art, the currently commercially available CONTROL-LINK® product may differ from that described in U.S. Pat. No. 6,681,110 as a mode of communication between an onsite component and a central server discussed in said patent (e.g. analog cellular signal) may comprise alternate modes of communication (e.g. satellite, Global System for Mobile communications (GSM), Code Division Multiple Access (CDMA), etc.).

A partial block diagram of the electrical components in FIG. 1A may be found in FIG. 1B. With respect to FIG. 1B, the flow of electrical power to a pole may generally be characterized by the following.

1. Electrical power flows from service distribution cabinet 44 to breaker A 31.
2. Power flows from breaker A 31 to control/contactor cabinet 45 via electrical cables 32 housed in conduit 23.
3. Power in electrical cables 32 reaches contactor module A 41 and leaves control/contactor cabinet 45.
    a. Moderator module 42, which directs power to the contactor modules and collects system data, may be operated remotely by control center 90 and via antenna 43.
4. Power in electrical cables 32 reach pole cabinet 46 at Pole A where power passes through disconnect switch 52, the current is regulated at ballast 51, and fixture bank 61 is powered.

It is of note that for the sake of brevity, FIG. 1B shows a complete circuit for Pole A only; however, one skilled in the art would know similar circuitry exists for Poles B-D illustrated in FIG. 1A. Further, as can be seen in FIG. 1B only one ballast 51 and capacitor is diagrammatically illustrated for a bank 61 of six lamps; this is intended merely to illustrate typical components of a lighting system and should not be considered representative of the number of ballasts 51 and capacitors required to operate a fixture bank 61. One skilled in the art would know that a fixture bank 61 of six lamps would likely utilize six ballasts and six capacitors, though other configurations are possible. Still further, it is of note that, as illustrated, conduit 23 is comprised of conductive material (e.g. steel) and conduit 22 is comprised of non-conductive material (e.g. PVC). The aforementioned qualifying statements regarding complete circuits, ballasts and capacitors, and conduit materials may be likewise applied to FIGS. 2B and 5A.

FIG. 1C illustrates a ground loop circuit produced for Pole A according to the electrical circuit illustrated in FIG. 1B. With respect to FIG. 1C, the flow of an imposed signal may generally be characterized by the following.

1. An imposed signal leaves a monitoring module 200 at control/contactor cabinet 45 along equipment ground wire 25 which terminates at pole cabinet ground bar 35.

2. The imposed signal continues along earth ground wire 27 to pole ground lug 62, and continues to earth ground electrode 26.
3. The imposed signal at earth ground electrode 26 travels through earth 100 to equipment ground electrode 28.
4. The imposed signal at equipment ground electrode 28 travels along equipment ground wire 29 to service cabinet ground bar 33.
5. The imposed signal continues along equipment ground wire 24 to contactor cabinet ground bar 34.
6. The imposed signal continues along equipment ground wire 25 to monitoring module 200 where results are monitored, measured, and compared against a baseline to calculate system impedance.

It is of note that FIG. 1C illustrates one possible ground loop circuit for Pole A only. However, one skilled in the art would know that similar ground loop circuits exist for Poles B-D illustrated in FIG. 1A.

While proper grounding methods produce the benefits of equipment and personal protection from electrical shock hazards, additional benefits may be achieved by active monitoring of the ground loop circuit illustrated in FIG. 1C. Active monitoring of the ground loop circuit, whether remotely (e.g. via control center 90) or onsite (e.g. via a user interface in monitoring module 200), may allow a user to ensure installation of the grounding system was performed correctly. For example, if earth ground electrode 26 was installed for all the poles illustrated in FIG. 1A except for Pole A, active monitoring of each pole's ground loop circuit (as illustrated in FIG. 1C) may show an impedance an order of magnitude or more higher for the Pole A ground loop circuit, clearly indicating to the contractor or remote control center 90 that Pole A is insufficiently grounded. It is of note that active monitoring of the signal(s) imposed on a ground loop circuit—whether remotely or onsite—is completed via inductive coupling, thus isolating the circuitry used to calculate impedance from the grounding components; this is a benefit over direct impedance measurements made on grounding components, which may present electrical shock hazards to personnel completing the measurements.

As a further benefit, active monitoring may allow a user to track increases in system impedance over the life of the electrical system which may not be readily observed otherwise (e.g. increases in grounding system impedance due to degradation of buried conductor insulation). Still further, once monitored impedance for a ground loop circuit has approached a threshold (as defined by governing codes, a user, or otherwise), monitoring module 200 may display an alarm onsite, as well as relay the alarm status to control center 90 which may, in turn, contact a user and/or disable components of the electrical system until the situation is remedied.

B. Exemplary Method and Apparatus Embodiment 1

Figure 2A:
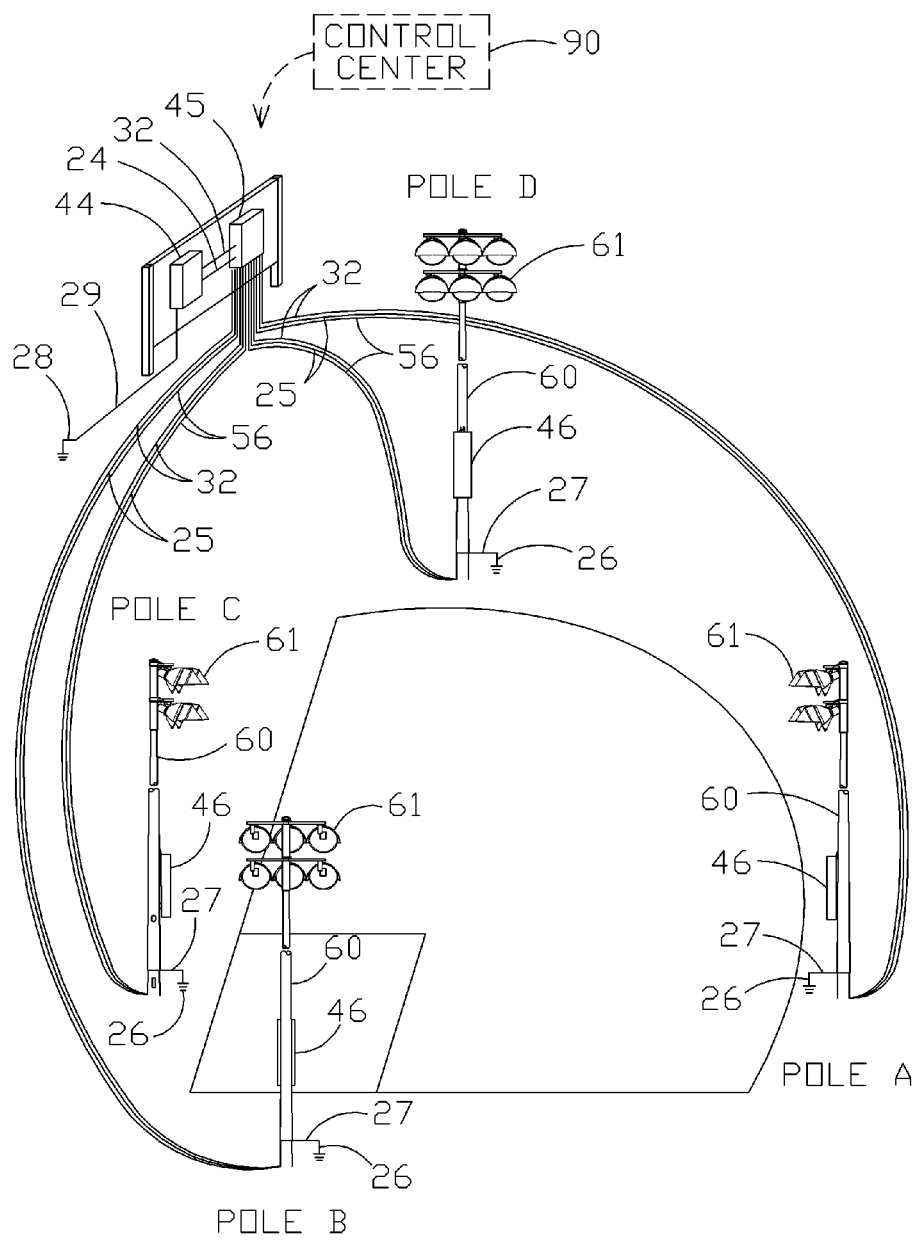
FIGS. 2A-2C illustrate a sports lighting system with ground loop circuit according to an exemplary embodiment.
Figure 2B:
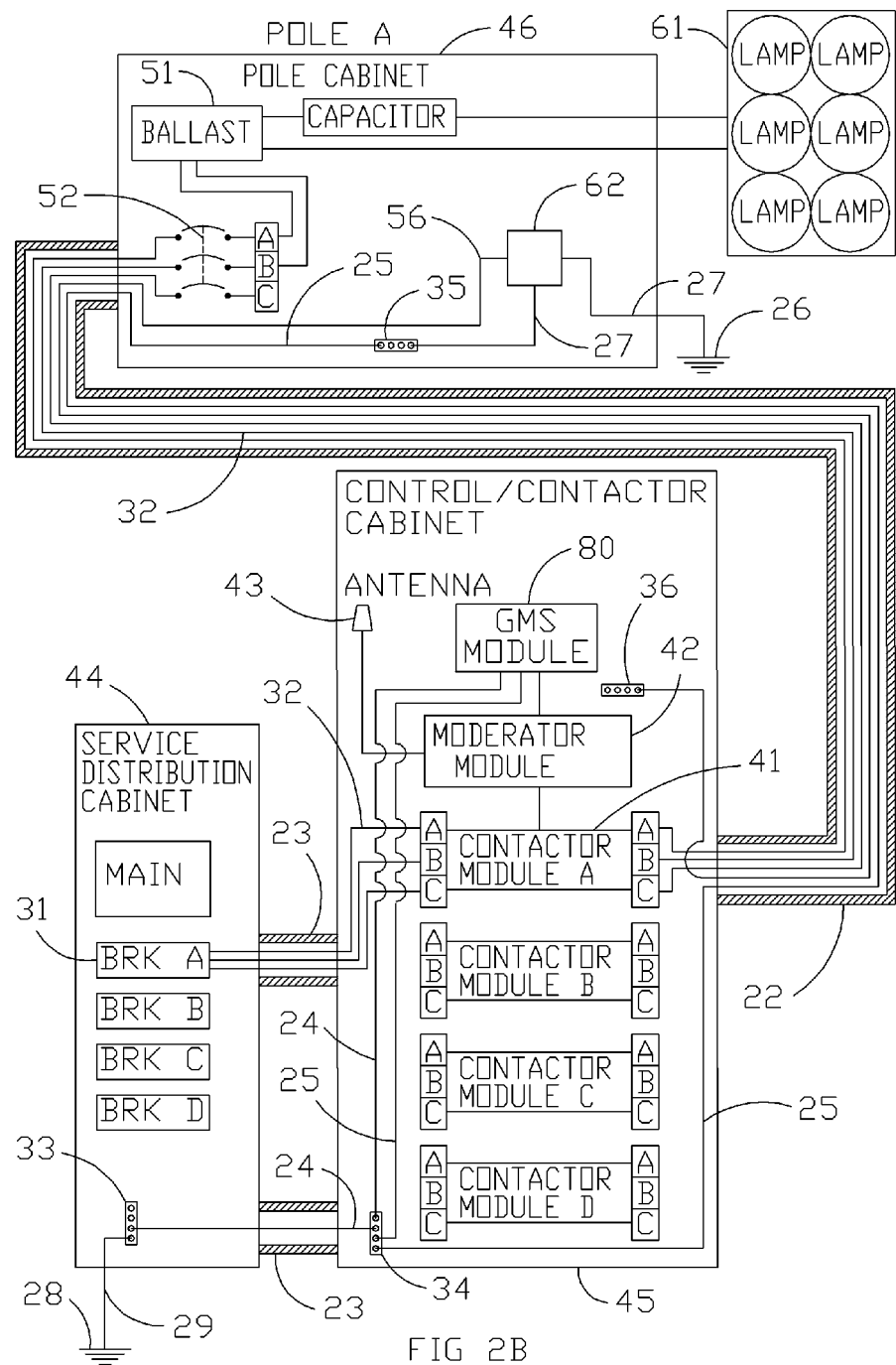
Figure 2C:
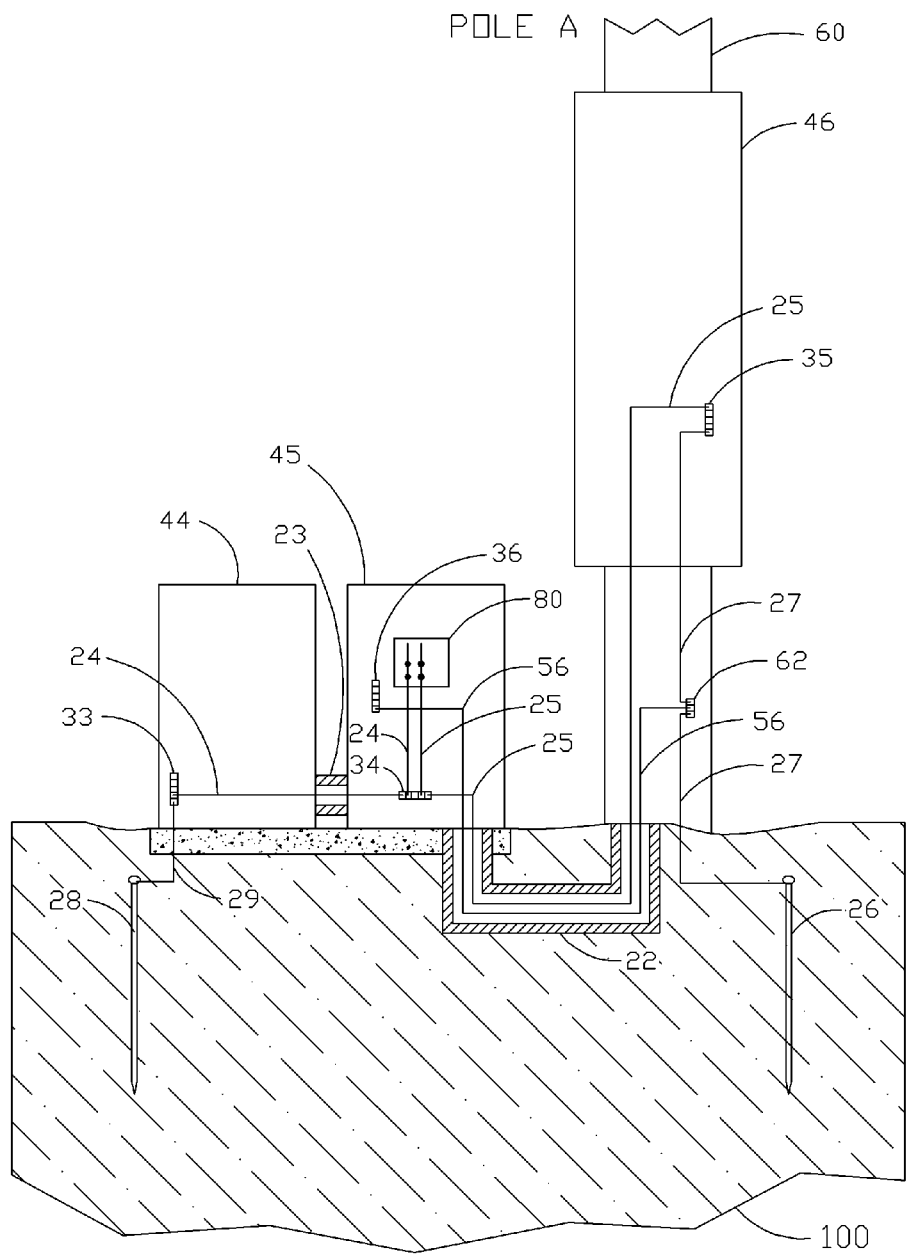
Figure 3A:
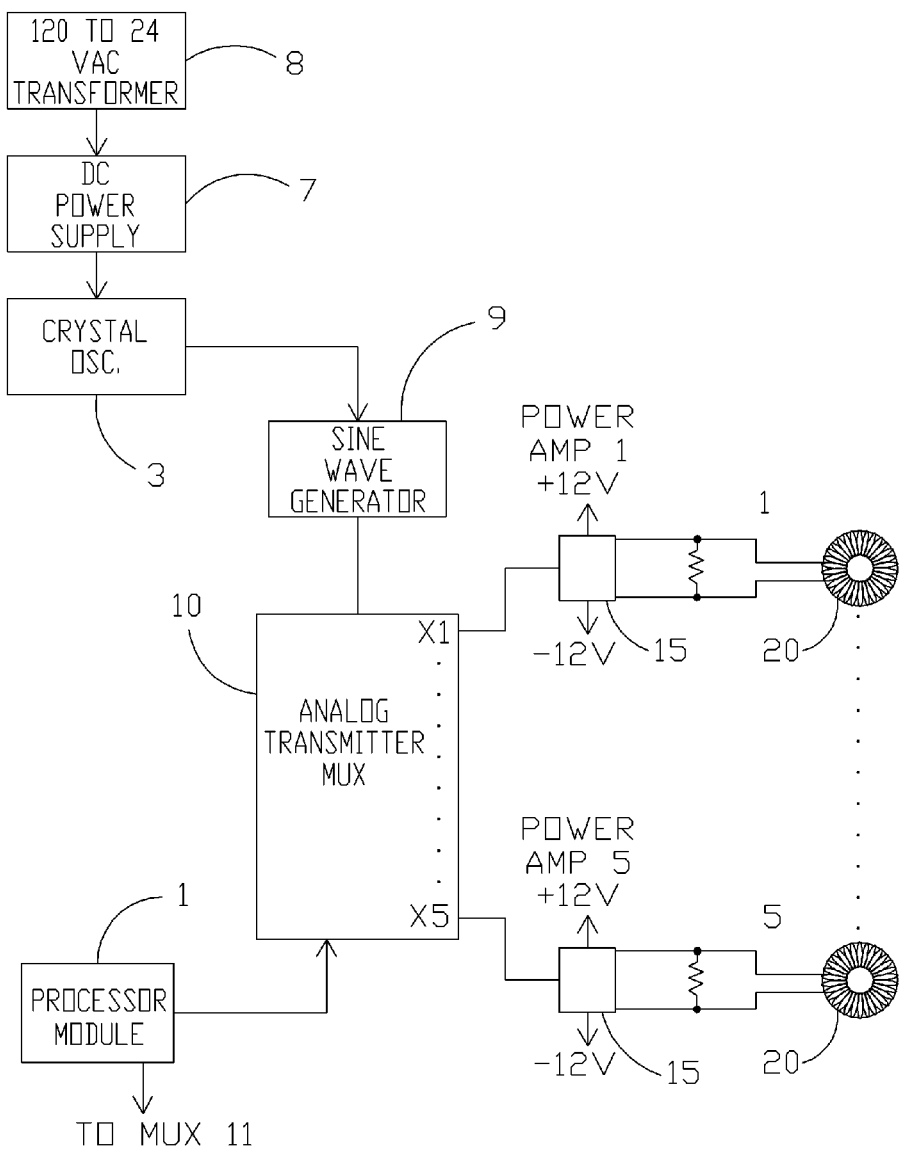
FIG. 3A illustrates diagrammatically the functionality of a first toroid according to exemplary embodiments.
Figure 3B:
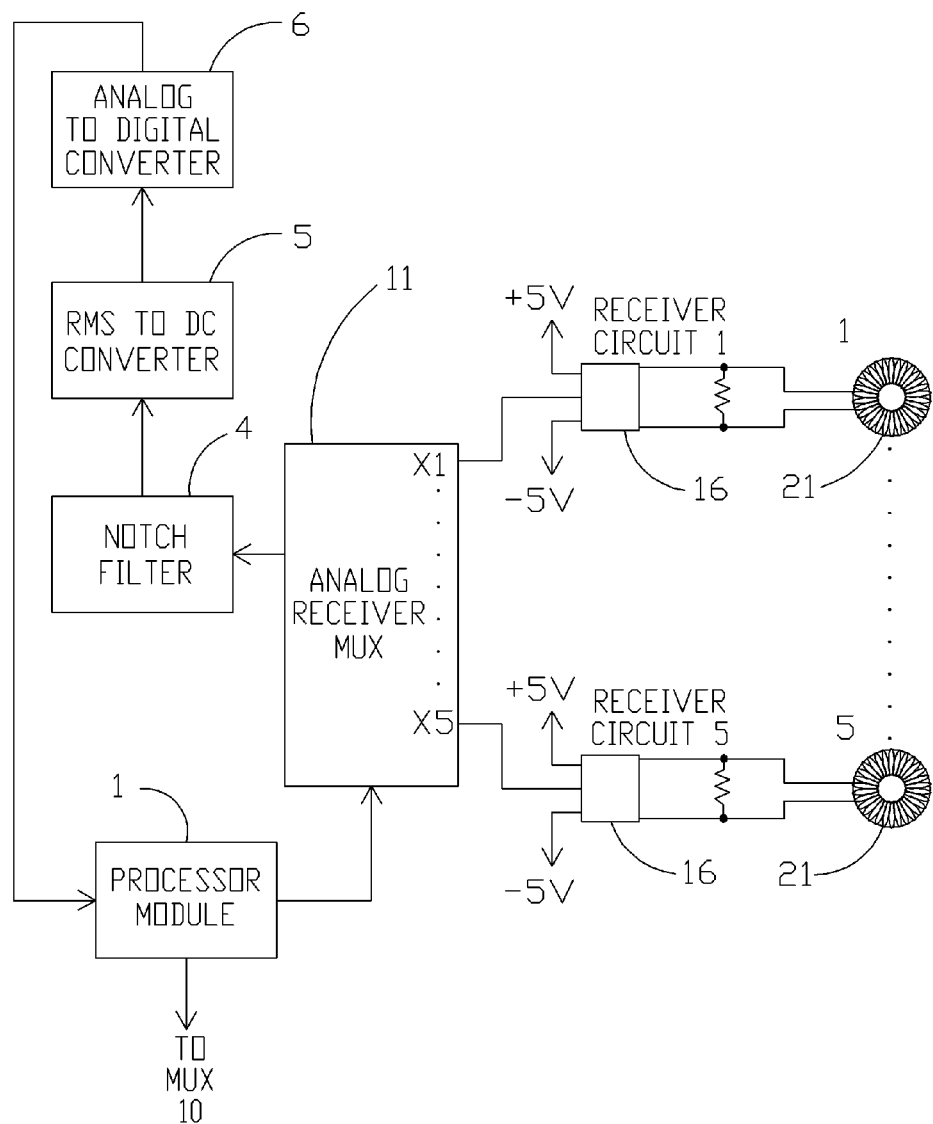
FIG. 3B illustrates diagrammatically the functionality of a second toroid according to exemplary embodiments.

A more specific exemplary embodiment, utilizing aspects of the generalized example described above, will now be described. An electrical system such as that illustrated in FIGS. 2A-2C is enabled with a ground monitoring system (GMS) module as illustrated in FIGS. 4A-4D. The GMS module comprises a series of toroids the functionality of which are illustrated in FIGS. 3A and 3B.

In this embodiment each pole 60 has two conductors (25 and 56) which run from a pole cabinet 46 to a contactor cabinet 45. A first ground loop circuit comprises loop grounding bar 36, conductor 56, ground lug 62, section of earth ground wire 27, pole cabinet ground bar 35, equipment ground wire 25, contactor cabinet ground bar 34, and GMS module 80. A second ground loop circuit comprises GMS module 80, equipment ground wire 24, contactor cabinet ground bar 34, service cabinet ground bar 33, service cabinet 44, conduit 23, and contactor cabinet 45; note service cabinet 44, conduit 23, and contactor cabinet 45 are electrically conductive to facilitate a complete electrical connection in the ground loop circuit.

Figure 4A:
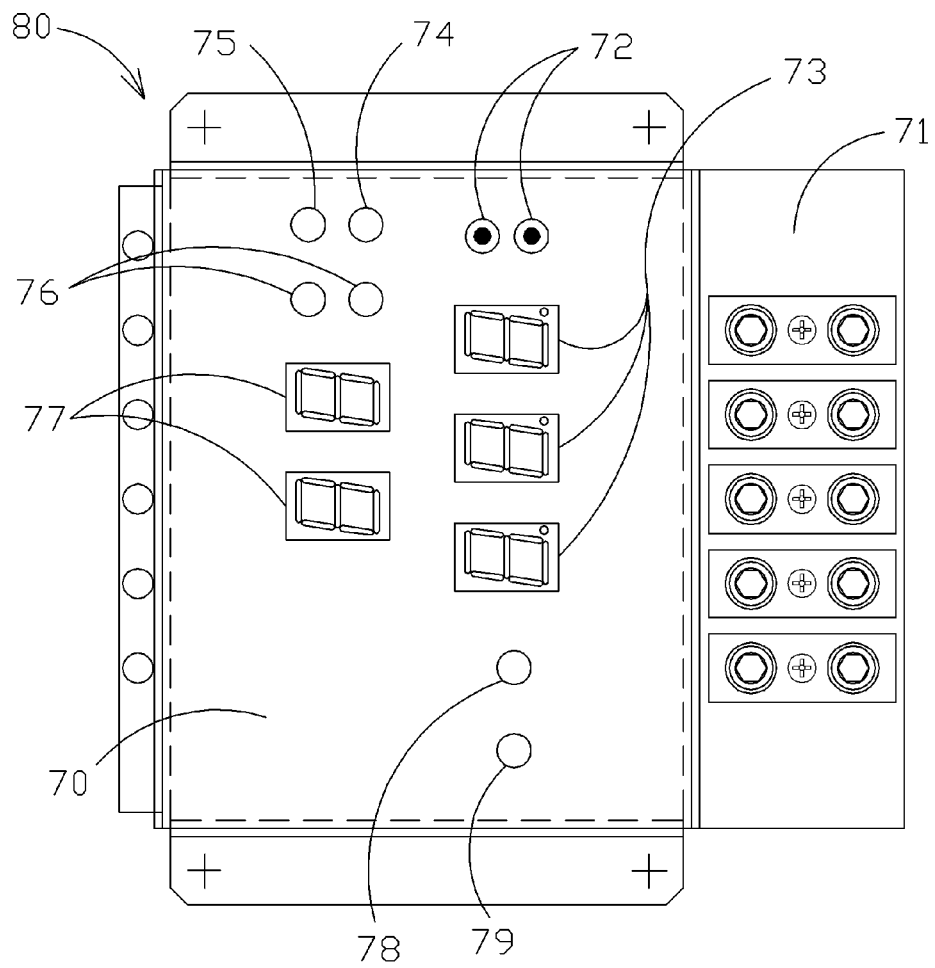
FIGS. 4A-4D illustrate one possible housing for the ground monitoring system (GMS) module and its components therein according to the exemplary embodiments.
Figure 4B:
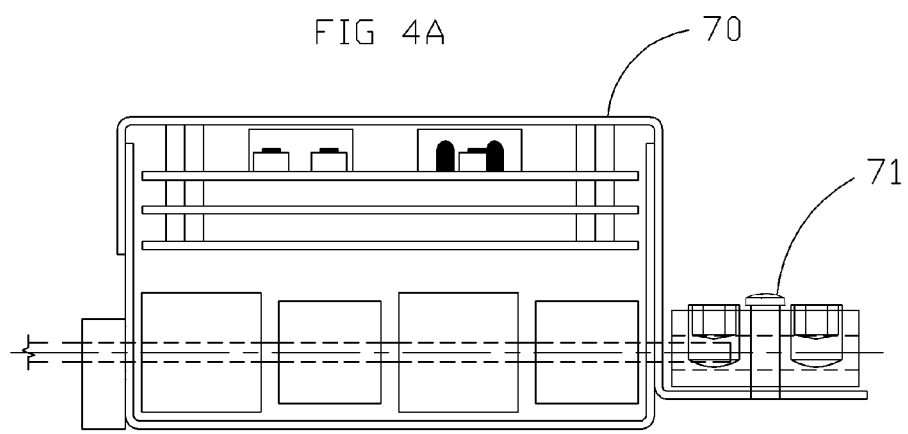
Figure 4C:
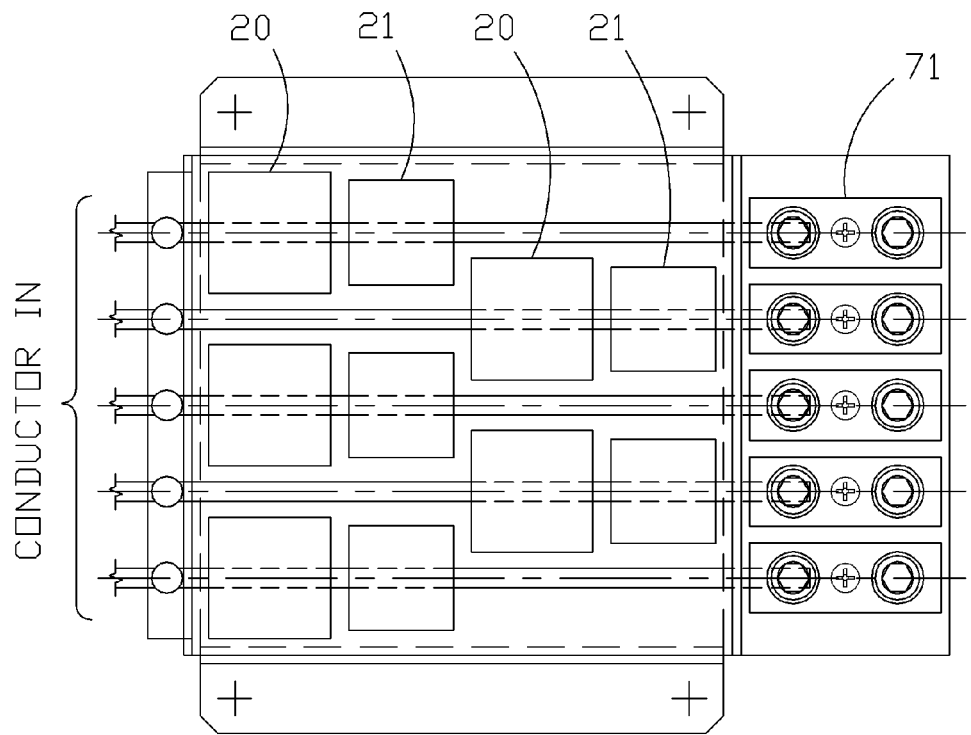
Figure 4D:
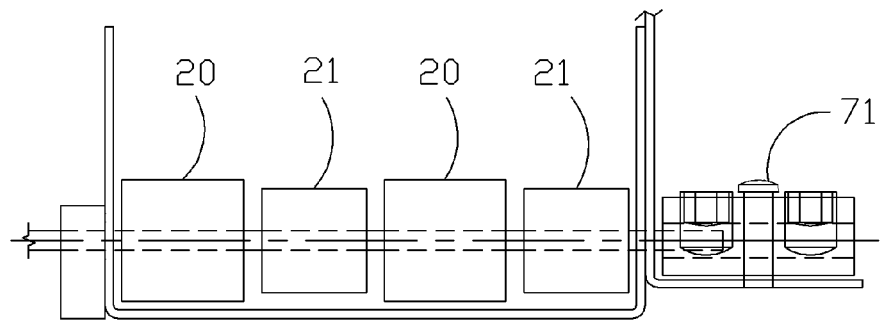

As can be seen from FIG. 4C, each conductor entering GMS module 80 (e.g. conductor sections 24 and 25 from ground bar 34 to GMS module 80 illustrated in FIG. 2C) passes through a first toroid 20 and second toroid 21 before landing at lug 71. First toroid 20 imposes a signal on the conductor (and thus, the ground loop circuit) and second toroid 21 receives said signal. FIG. 3A diagrammatically illustrates the functionality of first toroid 20, which may generally be characterized by the following.

1. A 120 to 24 VAC voltage transformer 8 powers a DC power supply 7 which, in turn, powers a crystal oscillator circuit (OSC) 3.
2. OSC circuit 3 produces a first voltage signal at 1.66 kHz with a square waveform.
   a. OSC 3 further acts as a 20 MHz clock input for the multiplexer output circuit. The use of OSCs as clock signals for integrated circuits is well known in the art.
3. The 1.66 kHz square wave from OSC 3 is converted to a sine wave by a sine wave generator 9.
4. An analog transmitter 10 directs the voltage signal to any one of a plurality of channels (shown to be five in FIGS. 3A and 3B, though this is by way of example and not by way of limitation) as determined by a processor module 1.
   a. An inherent benefit of analog transmitter 10/processor module 1 is such that a single ground loop circuit may be isolated, its impedance measured, and results displayed. Further, the energy required to run the multiplexer output circuit is minimized since only one toroid 20 is energized at a given time. However, other transmitter 10/processor 1 setups may be utilized without realizing the aforementioned benefits and still provide the necessary functionality for the exemplary embodiment.
5. The constant voltage signal is amplified by a power amplification circuit 15, maintaining a frequency of 1.66 kHz, and used to energize first toroid 20.
6. The constant voltage signal, at a frequency of 1.66 kHz, is imposed on a ground wire (see reference nos. 24 and 25) running through toroid 20.
7. A second voltage signal according to the above process is produced at 0.83 kHz and imposed on the ground wire (see reference nos. 24 and 25) running through toroid 20.

With respect to processor module 1, functionality further comprises calculation of ground loop circuit impedance, comparison of ground loop circuit impedance to threshold levels, display of ground loop circuit impedance values, and communication with a control system (whether remotely operated or otherwise). Processor module 1 may comprise any commercially available microcontroller (e.g. model UPSD 3233B-40U6 available from STMicroelectronics, Geneva, Switzerland) or analogous device.

Generally, the signal traveling through the ground loop circuit may be imposed at any frequency (given circuitry to impose and receive the signal at said frequency). However, if it is desirable for the ground monitoring system as envisioned to be integrated with other systems which may regulate power to the electrical system to allow for corrective action of an alarm condition (e.g. ground-fault circuit interrupters (GFCIs)), it may be beneficial for the frequency of the imposed signal to reflect that of the incoming power to the electrical system. For example, Underwriters Laboratories Inc. (UL) Guideline KCYC defines the acceptable voltages to ground for different classes of circuits. The electrical system illustrated in FIGS. 2A-C is generally defined as a Class C circuit as the incoming power is typically 480V—three phase at 60 Hz with each conductor measuring 277V to ground (assuming installation in the United States); UL-KCYC defines Class C as a circuit with reliable equipment grounding (per NEC code) with each conductor measuring no more than 300V to ground. Thus, if one were to integrate the ground monitoring system as envisioned with a Class C GFCI device, for the electrical system illustrated in FIGS. 2A-C, one would need to ensure reliable equipment grounding to satisfy the UL-KCYC requirement. As has been stated, the integrity (and thus, reliability) of the equipment grounding may be verified by the ground monitoring system described herein. Thus, for the system illustrated in FIGS. 2A-C operating at 480V—three phase at 60 Hz, it is beneficial to impose a signal at 60 Hz. It is of note, however, that the aforementioned method of determining the frequency of an imposed signal is equally applicable to other electrical systems (e.g. 240V—three phase at 50 Hz, which is common in Europe) and envisioned.

However, the difficulty in imposing and measuring a signal on a ground loop circuit for the electrical system illustrated in FIGS. 2A-C at 60 Hz is the amount of noise present at that frequency. One solution, then, is to measure impedance at two frequencies, calculate the resistive (R) and inductive (L) components of the impedance, and calculate impedance at 60 Hz ($Z_{60}$). In the present embodiment signals are imposed and measured at 1.66 kHz and 0.83 kHz as these frequencies are not harmonics of 60 Hz. The calculation of impedance at 60 Hz is described by the following:

$$Z_1 = \sqrt{R^2 + (2\pi f_1 L)^2}$$

$$Z_1^2 = R^2 + (2\pi f_1 L)^2$$

$$Z_2 = \sqrt{R^2 + (2\pi f_2 L)^2}$$

$$Z_2^2 = R^2 + (2\pi f_2 L)^2$$

wherein $Z_1$ is the impedance of the ground loop circuit at a first measurement frequency, R is the resistance of the ground loop circuit, $f_1$ is the first measurement frequency (e.g. 1.66 kHz), L is the inductance of the ground loop circuit, $Z_2$ is the impedance of the ground loop circuit at a second measurement frequency, and $f_2$ is the second measurement frequency (e.g. 0.83 kHz).

The aforementioned formulas for the impedance of the ground loop circuit at two measurement frequencies may be solved simultaneously to provide the following formulas for the inductance, L, and the resistance, R, of the ground loop circuit.

$$Z_1^2 - Z_2^2 = R^2 + (2\pi f_1 L)^2 - R^2 - (2\pi f_2 L)^2$$
$$= (2\pi f_1 L)^2 - (2\pi f_2 L)^2$$
$$= L^2[(2\pi f_1)^2 - (2\pi f_2)^2]$$

$$L = \sqrt{\frac{Z_1^2 - Z_2^2}{(2\pi f_1)^2 - (2\pi f_2)^2}}$$

$$Z_1 = \sqrt{R^2 + (2\pi f_1 L)^2}$$

$$Z_1^2 = R^2 + (2\pi f_1 L)^2$$

$$R = \sqrt{Z_1^2 - (2\pi f_1 L)^2}$$

$$R = \sqrt{Z_1^2 - (2\pi f_1)^2 \left(\frac{Z_1^2 - Z_2^2}{(2\pi f_1)^2 - (2\pi f_2)^2}\right)}$$

The calculated formulas for the inductance L, and resistance, R, may then be substituted for said variables in the original equation and solved for the impedance of the ground loop circuit ($Z_{60}$) at a frequency of 60 Hz ($f_{60}$).

$$Z_{60} = \sqrt{R^2 + (2\pi f_{60} L)^2}$$

$$Z_{60} = \sqrt{R^2 + (2\pi 60 L)^2}$$

$$Z_{60} = \sqrt{\left(\sqrt{Z_1^2 - (2\pi f_1)^2 \left(\frac{Z_1^2 - Z_2^2}{(2\pi f_1)^2 - (2\pi f_2)^2}\right)}\right)^2 + \left((2\pi 60)^2 \left(\sqrt{\frac{Z_1^2 - Z_2^2}{(2\pi f_1)^2 - (2\pi f_2)^2}}\right)^2\right)}$$

$$Z_{60} = \sqrt{\left(Z_1^2 - (2\pi f_1)^2 \left(\frac{Z_1^2 - Z_2^2}{(2\pi f_1)^2 - (2\pi f_2)^2}\right)\right)^2 + \left((120\pi)^2 \left(\sqrt{\frac{Z_1^2 - Z_2^2}{(2\pi f_1)^2 - (2\pi f_2)^2}}\right)\right)}$$

The imposed voltage signals induce current in a second toroid 21 of each ground loop circuit being monitored, the functionality of which is diagrammatically illustrated in FIG. 3B and may generally be characterized by the following.
1. The induced current produces a small voltage in second toroid 21.
2. A receiver circuit 16 amplifies and buffers the signal front toroid 21.
3. An analog receiver 11, as directed by processor module 1, routes the signal to a notch filter 4 which filters out noise from the voltage signal to isolate the frequency of interest (e.g. 1.66 kHz for the first frequency and 0.83 kHz for the second frequency), with a pass bandwidth of ±100 Hz.
4. The signal is converted from AC to DC by a RMS to DC converter 5.
5. The DC signal is then converted by a 12-bit analog to digital converter 6 from an analog waveform to a binary code, which is processed and stored by processor module 1.
   Ground loop circuit impedance is measured at the time of installation, thus providing a baseline value. When second toroid 21 is energized and produces a signal to the multiplexer input circuit, any changes in ground loop circuit impedance are reflected in the value of said signal. Thus, knowing the imposed constant voltage (at both 1.66 kHz and 0.83 kHz), the measured second toroid signal (at both 1.66 kHz and 0.83 kHz), and the ground loop circuit baseline impedance, processor module 1 is able to calculate changes in impedance of the ground loop circuit at 60 Hz by calculations well known in the art and previously described.

Activation of the multiplexer input and output circuits may be enabled by a remote operation functionality (e.g. CONTROL-LINK®) at regularly scheduled intervals, or when deemed necessary by a control center 90 or by a user. Alternatively, or in addition, activation of the multiplexer input and output circuits may be enabled onsite by a user interface on GMS module 80. One possible user interface and housing for GMS module 80 is illustrated in FIGS. 4A-4D and may generally be characterized by the following.

A housing 70 which may display user interface functionality comprising:
- A pair of pushbuttons 76 which toggle through the channels in processor module 1,
  - Note that there may be any number of channels available but at least enough such that each ground loop circuit has a dedicated channel. For example, FIG. 4C illustrates five conductors entering five pairs of toroids. Thus, for this example there would be at least five channels available.
- A display 77 to illustrate which channel is active,
- A display 73 to illustrate the impedance value for the active channel,
- A pair of LEDs 72 (e.g. one green and one red) to visually indicate alarm status (e.g. green to indicate sufficient ground loop circuit impedance and red to indicate an alarm notification),
- A pushbutton 75 which, when pressed, displays an instantaneous maximum impedance value (as indicated by channel display 77 and value display 73 for the channels in processor module 1 for a finite period of time (e.g. two seconds), and then displays an instantaneous minimum impedance value (as indicated by channel display 77 and value display 73 for the channels in processor module 1) for a finite period of time (e.g. two seconds),
- A pushbutton 74 which, when pressed, may erase impedance values stored in processor module 1 and reset max/min values,
- A pushbutton 79 which, when pressed, will initiate operation of the multiplexer input and output circuits, as was described for FIGS. 3A and 3B, and display the results on channel display 77 and value display 73 for each channel in processor module 1 for a finite period of time (e.g. two seconds for each channel); and,
- An optional pushbutton 78 which, when pressed, may display alternative data on value display 73.
- A series of landing lugs 71 for each channel (shown by way of example and not by way of limitation to be five lugs for five incoming conductors, each of which has a dedicated channel).
- A first toroid 20 and a second toroid 21, the functionality of which was described for FIGS. 3A and 3B, for each channel.

It is of note that the alternative data available via the optional pushbutton 78 may vary depending on the application. For example, in many applications it may be beneficial for an electrical system such as that illustrated in FIGS. 2A-C to comprise methods of disabling power to components of the electrical system (e.g. via GFCI) if component impedance increases to an unacceptable threshold, in addition to monitoring and reporting such conditions. If such were the case, optional pushbutton 78 may allow data relevant to GFCI functionality (e.g. leakage current) to be displayed. As a further example, display of information relevant to the application layout may be enabled by optional pushbutton 78 (e.g. ground wire size, earth ground electrode material, etc.).

The present exemplary embodiment detects the presence and functionality of the grounding components of the electrical system illustrated in FIGS. 2A-C including equipment ground electrode 28, equipment ground wire 29, equipment ground wire 24, and connections associated with the service cabinet 44 and contactor cabinet 45 via the second ground loop circuit as previously described; as well as the equipment ground wire 25, conductor 56, section of earth ground wire 27 spanning lug 62 to ground bar 35, and connections associated with each pole 60 via the first ground loop circuit as previously described.

A primary benefit of the exemplary embodiment as described is such that a reliable ground is ensured for the electrical system illustrated in FIGS. 2A-C (thus adhering to UL Class C requirements). Additionally, if it is desirable for the electrical system illustrated in FIGS. 2A-C to further comprise systems which may regulate power to the electrical system to allow for corrective action of an alarm condition (e.g. GFCIs), active monitoring of the grounding components allows the voltage to ground to be limited to a specified value (thus adhering to UL KCYC requirements).

C. Exemplary Method and Apparatus Embodiment 2

Figure 5A:
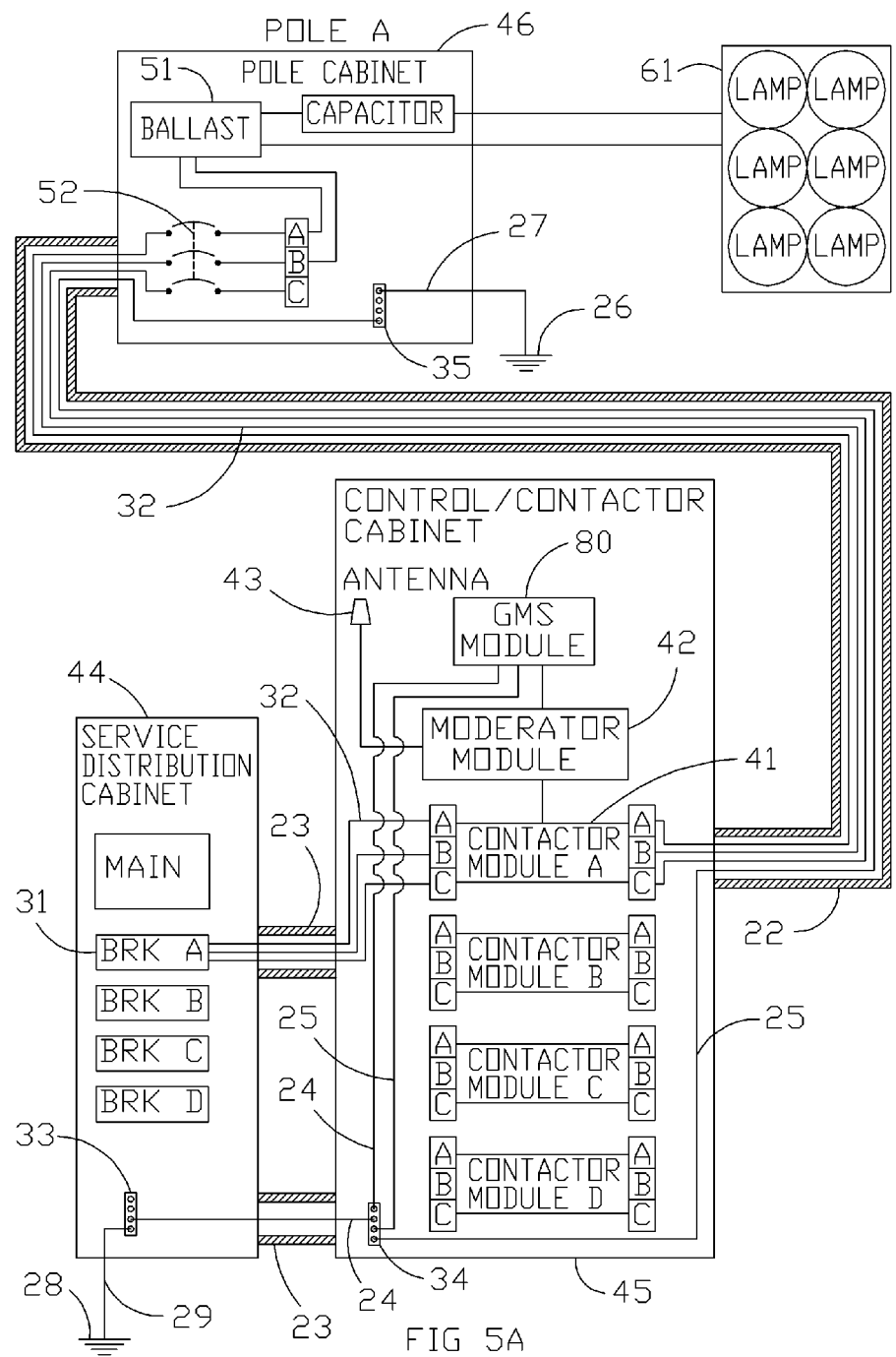
FIGS. 5A and 5B illustrate a sports lighting system with ground loop circuit according to an alternative exemplary embodiment.
Figure 5B:
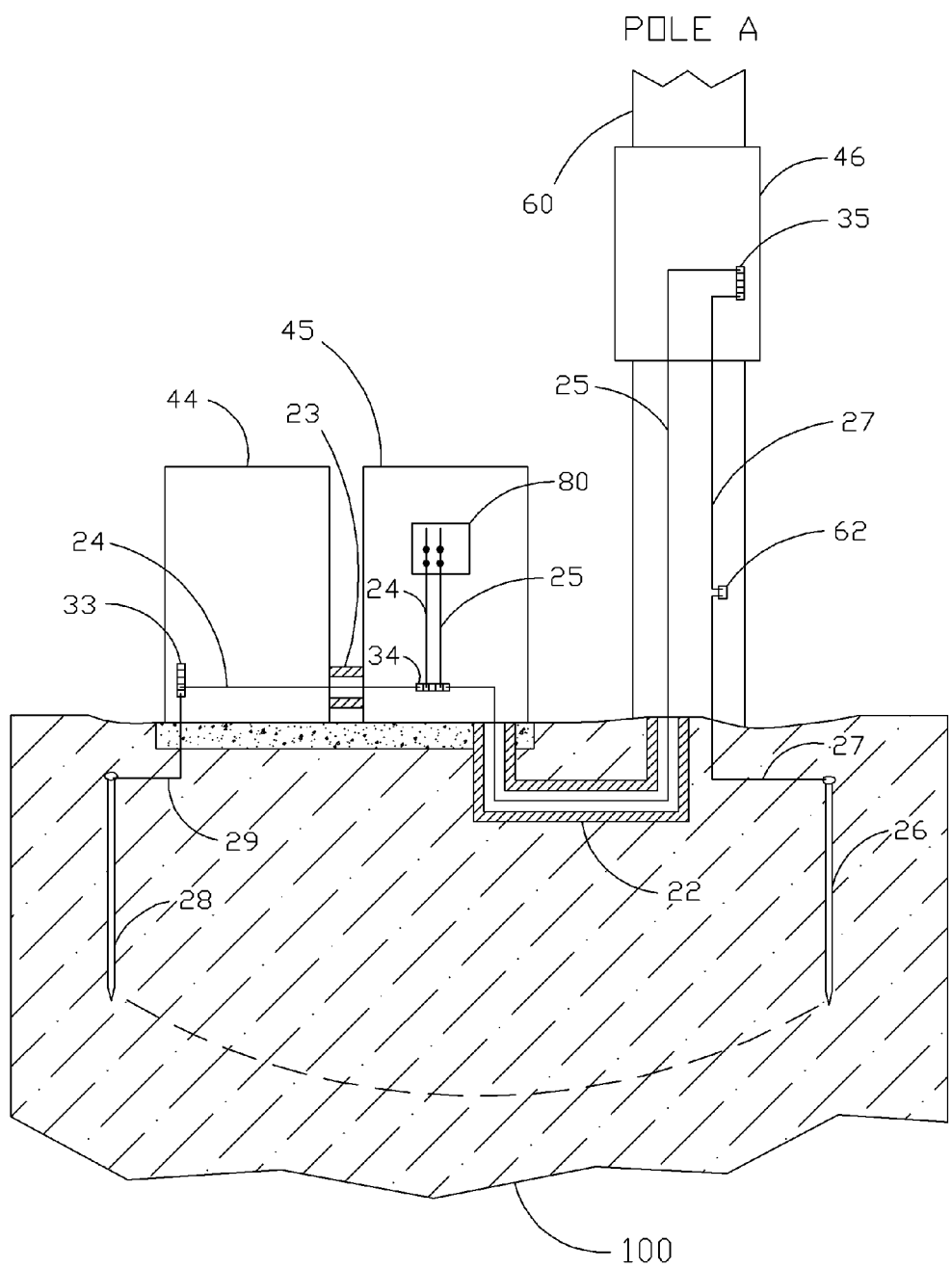

An alternative embodiment of the invention envisions an electrical system such as that illustrated in FIGS. 1A, 5A, and 5B enabled with a GMS module as illustrated in FIGS. 4A-4D. The GMS module comprises a series of toroids the functionality of which is described in Exemplary Method and Apparatus Embodiment 1.

Similar to Exemplary Method and Apparatus Embodiment 1, in this embodiment the electrical system has two ground loop circuits. The first ground loop circuit comprises GMS module 80, equipment ground wire 25, contactor cabinet ground bar 34, pole cabinet ground bar 35, earth ground wire 27, pole ground lug 62, earth ground electrode 26, earth 100, equipment ground electrode 28, equipment ground wire 29, cabinet ground bar 33, and equipment ground wire 24. Note that the flow of an imposed signal from electrode 26 to electrode 28 via earth 100 is diagrammatically illustrated by a dashed line in FIG. 5B. The first ground loop circuit detects the presence and functionality of grounding components of the electrical system illustrated in FIGS. 1A, 5A, and 5B including equipment ground wire 25, earth ground wire 27, earth ground electrode 26, connections associated with each pole 60, equipment ground electrode 28, and equipment ground wire 29. The second ground loop circuit in this embodiment is the same as the second ground loop circuit in Exemplary Method and Apparatus Embodiment 1.

A primary benefit of the exemplary embodiment as described is such that one can determine if poles are properly grounded without extensive testing or digging up electrodes. Whereas the benefits in Exemplary Method and Apparatus Embodiment 1 are of a personal protection nature, the benefits in the present embodiment are of an equipment longevity nature.

D. Options and Alternatives

The invention may take many forms and embodiments. The foregoing examples are but a few of those. To give some sense of some options and alternatives, a few examples are given below.

Generally, the exemplary embodiments described herein illustrate a complete electrical circuit for a single bank of light fixtures (see FIG. 1B). It is of note, however, that this is by way of example and not by way of limitation. For example, those skilled in the art would know that moderator module 42 may regulate all of the contactor modules within control/contactor cabinet 45, and/or a pole cabinet 46 and the components therein may power a plurality of fixtures 61. As a further example, a single control center 90 may enable remote operation of a plurality of GMS modules 80, thus facilitating active monitoring of grounding systems at multiple equipment locations from a single point.

Further, the methods of monitoring and testing grounding components described herein may be applied to electrical systems other than those illustrated in the exemplary embodiments (e.g. street lighting, food display cases, HVAC units) without departing from at least some aspects of the invention. For example, an electrical system similar to those illustrated and referenced herein, but not adhering to UL class requirements (e.g. Class C, KCYC), may still glean benefits (e.g. personal protection from electrical shock hazards) from aspects of the invention.

Generally, the exemplary embodiments described herein illustrate remote operation of GMS module 80 enabled by control center 90, a specific example of which is commercially available from Musco Sports Lighting, LLC under the trade name CONTROL-LINK®. However, it is of note that the remote operation functionality may comprise any methods of communicating between GMS module 80 and a central server and is not limited to CONTROL-LINK®.

Further, location of GMS module 80 is not limited to those illustrated in the exemplary embodiments. For example, if the application is a food display case there may not be a contactor cabinet 45 in which to house GMS module 80—some other enclosure may be available. Aspects according to the invention (e.g. imposing and receiving a signal to determine impedance, determining trends in system impedance over time, etc.) are equally applicable to systems which comprise components other than those described herein (e.g. light fixtures 61), house GMS module 80 in alternative locations, and/or comprise ground loop circuits other than those described herein.

What is claimed is:

1. A method of monitoring a ground loop circuit in an electrical system comprising components that are buried underground in earth and components that are accessible by personnel, the method comprising:
   a. isolating the components that are buried underground in the ground loop circuit wherein at least a portion of the ground loop circuit comprises a path through the earth;
   b. measuring impedance in the ground loop circuit to derive a baseline impedance for the ground loop circuit;
   c. imposing signals on the ground loop circuit at differing times and/or differing frequencies;
   d. receiving the imposed signals and determining impedance in the ground loop circuit from the received imposed signals;
   e. comparing determined impedance relative to baseline impedance; and
   f. taking an action if the comparison meets a predetermined condition wherein the action comprises one or more of:
      i. communicating an error or alarm condition;
      ii. applying a remedy; or
      iii. inspecting the electrical system.

2. The method of claim 1 wherein the communicating an error or alarm condition comprises one or more of:
   a. displaying indicia on a display;
   b. actuating an alarm; or
   c. sending a message.

3. The method of claim 1 wherein the applying a remedy comprises disabling electrical power to at least a portion of the electrical system.

4. The method of claim 1 applied to a plurality of ground loop circuits in an electrical system.

5. The method of claim 1 wherein the electrical system comprises a wide area sports lighting system.

6. The method of claim 5 wherein the wide area lighting system comprises a plurality of ground loop circuits and each ground loop circuit is monitored by first steps a-f and second steps a-f.

7. A method of monitoring, tracking, and testing the impedance of a ground loop circuit in an electrical system comprising:
   a. providing one or more ground loop circuits in an electrical system;
   b. determining a baseline impedance for each ground loop circuit;
   c. imposing on each ground loop circuit a signal or signals by a first inductive element of an output circuit;
   d. receiving on each ground loop circuit a signal or signals which induces a response in a second inductive element of an input circuit;
   e. interpreting the induced response on the second inductive element, and relative to the baseline impedance, determining impedance of the ground loop circuit;
   f. comparing determined impedance to a threshold value; and
   g. taking further action if the determined impedance approaches or exceeds the threshold value, wherein the further action comprises one or more of:
      i. issuing an alarm notification; or
      ii. disabling some portion of the electrical system;
   h. wherein the output circuit further comprises:
      i. means for producing the imposed signal at a desired frequency;
      ii. means for directing the imposed signal to a desired first inductive element;
      iii. so that the desired first inductive element will impose the signal on the desired ground loop circuit at the desired frequency.

8. The method of claim 7 wherein the signals may be imposed any number of times at any number of frequencies to facilitate determination of impedance at a desired frequency.

9. The method of claim 7 further comprising a component which can store determined impedance values for each ground loop circuit.

10. The method of claim 9 wherein stored determined impedance values can be recalled to determine trends in the data.

11. The method of claim 7 wherein the input circuit further comprises:
   a. means for receiving the induced response from a desired second inductive element;
   b. means for analyzing the induced response and comparing to as baseline impedance;
   c. so that impedance for a desired ground loop circuit may be determined.

12. The method of claim 11 wherein the impedance is determined by a. measuring ground loop circuit impedance at a first frequency;
b. measuring ground loop circuit impedance at a second frequency;
c. calculating resistance and inductance of the ground loop circuit relative to the measured impedances at a first and second frequency; and
d. and determining ground loop impedance at a desired frequency relative to the calculated resistance and inductance.

13. The method of claim 7 wherein the signals may be imposed on a regular schedule.

14. The method of claim 7 wherein the signals may be imposed at-will.

15. The method of claim 13 wherein the imposed signals are controlled by a remote control center wirelessly communicating with the output circuit.

16. The method of claim 14 wherein the imposed signals are controlled by a manually operated display in communication with the output circuit.

17. The method of claim 7 wherein the alarm notification comprises communication of the alarm to a remote control center physically located remotely from the electrical system and having means to provide; (i) on/off control of power to the electrical system; and (ii) adjustable power levels to the electrical system.

18. The method of claim 17 wherein the remote control center can take any of the following actions in response to an alarm notification:
   a. continue to track impedance levels until another defined threshold level is approached;
   b. notify a user of the alarm notification and inquire about further actions; or
   c. disable power to some portion of the electrical system.

19. The method of claim 18 further comprising wireless connection between the remote control center and a power regulating component of the electrical system such that commands sent from the remote control center to disable power of at least a portion of the electrical system may be effectuated.

20. The method of claim 16 wherein the manually operated display comprises any combination of:
   a. a channel for each ground loop circuit being monitored;
   b. means for selecting between the plurality of channels;
   c. means for imposing a signal or a plurality of signals on any of the plurality of channels;
   d. means for representing the alarm condition status for each Channel;
   e. means for representing stored data for each channel; and
   f. means for representing pertinent comparative data between channels.

21. The method of claim 1 further comprising:
   a. isolating the components that are accessible by personnel in a second ground loop circuit;
   b. measuring impedance in the second ground loop circuit to derive a baseline impedance for the second ground loop circuit;
   c. imposing signals on the second ground loop circuit at differing times and/or differing frequencies;
   d. receiving the imposed signals and determining impedance in the second ground loop circuit from the received imposed signals;
   e. comparing determined impedance relative to baseline impedance; and
   f. taking an action if the comparison meets a predetermined condition wherein the action comprises one or more of:
      i. communicating an error or alarm condition;
      ii. applying a remedy; or
      iii. inspecting the electrical system.

22. The method of claim 21 wherein the electrical system comprises a wide area sports lighting system.

* * * * *